United States Patent
Hashim et al.

(10) Patent No.: US 9,925,878 B2
(45) Date of Patent: Mar. 27, 2018

(54) BUS PRE-CHARGE CONTROL USING A BUCK CONVERTER

(71) Applicant: Ford Global Technologies, LLC, Dearborn, MI (US)

(72) Inventors: Hasdi R. Hashim, Ann Arbor, MI (US); Bruce Carvell Blakemore, Plymouth, MI (US); Arnold Kweku Mensah-Brown, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1068 days.

(21) Appl. No.: 14/037,960

(22) Filed: Sep. 26, 2013

(65) Prior Publication Data
US 2015/0084404 A1    Mar. 26, 2015

(51) Int. Cl.
B60L 11/18    (2006.01)
B60L 15/08    (2006.01)

(52) U.S. Cl.
CPC .............. B60L 11/18 (2013.01); B60L 15/08 (2013.01); *B60L 2270/20* (2013.01); *Y02T 10/645* (2013.01); *Y10T 307/865* (2015.04)

(58) Field of Classification Search
USPC .................................................. 307/9.1, 131
See application file for complete search history.

(56) References Cited

U.S. PATENT DOCUMENTS

| | | | |
|---|---|---|---|
| 6,597,072 B2 * | 7/2003 | Yamazaki | B60L 11/1851 307/9.1 |
| 7,230,395 B2 | 6/2007 | Horii | |
| 7,538,990 B2 | 5/2009 | Belisle et al. | |
| 7,557,583 B2 | 7/2009 | Zettel et al. | |
| 7,619,906 B2 | 11/2009 | Schnetzka | |
| 7,830,036 B2 | 11/2010 | Wei et al. | |
| 7,832,513 B2 | 11/2010 | Verbrugge et al. | |
| 7,956,488 B2 | 6/2011 | Kobayashi et al. | |
| 8,013,548 B2 | 9/2011 | King et al. | |

(Continued)

FOREIGN PATENT DOCUMENTS

| | | |
|---|---|---|
| DE | 10235431 A1 | 2/2004 |
| JP | 2006304408 A | 11/2006 |
| JP | 2009290920 A | 12/2009 |

OTHER PUBLICATIONS

Chinese Patent Office, First Office Action for the corresponding Chinese Patent Application No. 201410455803.6, dated Dec. 25, 2017.

*Primary Examiner* — Hal Kaplan
*Assistant Examiner* — Xuan Ly
(74) *Attorney, Agent, or Firm* — David Kelley; Brooks Kushman P.C.

(57) ABSTRACT

A vehicle is disclosed having a traction battery and an electrical impedance connected by a contactor. A pre-charge circuit is disclosed that controls current flow from the traction battery through the pre-charge circuit to the electrical impedance to increase voltage at the electrical impedance such that as the voltage approaches a voltage of the traction battery, a duty cycle of the pre-charge circuit approaches a maximum value and a current through the pre-charge circuit approaches a minimum value. In response to current falling below a predetermined value, the contactor is closed. A current sensor is disclosed that is located in the pre-charge circuit. A method of operating the pre-charge circuit is disclosed.

19 Claims, 3 Drawing Sheets

(56) References Cited

U.S. PATENT DOCUMENTS

| | | | |
|---|---|---|---|
| 8,049,372 B2 | 11/2011 | Newhouse et al. | |
| 8,129,951 B2* | 3/2012 | Turner | B60L 11/14 |
| | | | 320/134 |
| 8,133,033 B2 | 3/2012 | Abraham | |
| 8,186,466 B2 | 5/2012 | Verbrugge et al. | |
| 8,203,810 B2 | 6/2012 | Bryan et al. | |
| 8,575,940 B2 | 11/2013 | Yugou et al. | |
| 2006/0071557 A1 | 4/2006 | Osawa et al. | |
| 2011/0309809 A1* | 12/2011 | Rao | H02H 9/001 |
| | | | 323/282 |
| 2011/0316489 A1 | 12/2011 | Norimatsu et al. | |
| 2012/0025768 A1 | 2/2012 | Nakano et al. | |
| 2012/0080938 A1 | 4/2012 | Rutkowski et al. | |
| 2012/0235661 A1 | 9/2012 | Roessler et al. | |
| 2013/0063087 A1 | 3/2013 | Martaeng | |
| 2013/0127381 A1* | 5/2013 | Meiners | H02M 5/4585 |
| | | | 318/376 |
| 2014/0028088 A1* | 1/2014 | Salziger | B60R 16/02 |
| | | | 307/9.1 |
| 2014/0343776 A1* | 11/2014 | Ang | H01M 10/4257 |
| | | | 701/22 |

* cited by examiner

BUS PRE-CHARGE CONTROL USING A BUCK CONVERTER

TECHNICAL FIELD

This application relates to pre-charging an electrical load of a vehicle from a traction battery to prolong the life of a contactor.

BACKGROUND

Vehicles using a high-voltage battery pack generally include a main contactor to switch battery power to the power electronic components. There is generally some capacitance associated with the power electronics circuitry. This capacitance can create large inrush currents when closing the main contactor. These large inrush currents can create an arc across the contacts causing damage to or reducing the operating life of the contacts and creating sparks. To eliminate the large inrush currents and to protect the main contactor, a pre-charge circuit is often used in parallel with the main contactor.

A typical pre-charge circuit may consist of a contactor in series with a resistor connected across the main contactor. During power-up of the vehicle, the pre-charge contactor is closed and current flows through the pre-charge contactor and resistor. The resistor is selected to limit the amount of current that flows. When the bus has reached a desired voltage or is within a desired range, the main contactor may be switched on and the pre-charge contactor may be switched off. Although these pre-charge circuits may reduce the voltage across the main contractor during switch-on, there may still be some small voltage across the main contactor that may damage the contactor over time.

A typical pre-charge event is ended by measuring the voltage difference between the battery output and the main contactor output using a voltage divider circuit. A high-precision voltage divider circuit is required to measure a near zero voltage for a high voltage over typical automotive temperature ranges. In addition, this type of circuit may be required on the battery output and the main contactor output which adds additional cost to the vehicle.

SUMMARY

A vehicle includes a traction battery, a contactor configured to connect the traction battery and electrical impedance, and a pre-charge circuit. In response to a close signal for the contactor, the pre-charge circuit is configured to control the flow of current from the traction battery through the pre-charge circuit to the electrical impedance to increase the voltage at the electrical impedance such that as the voltage approaches the traction battery voltage, a duty cycle of the pre-charge circuit approaches 100% and the current through the pre-charge circuit approaches zero. In response to a magnitude of the current falling below a predetermined value, the pre-charge circuit is configured to close the contactor. The pre-charge circuit may be configured to measure the current flow through the pre-charge circuit and control the current through the pre-charge circuit to a predetermined range based on the measure of current. The pre-charge circuit may be further configured to control the current through the pre-charge circuit to a predetermined range substantially less than a rated current of the electrical impedance. The pre-charge circuit may include a current sensor having a range such that a current less than a rated current of the electrical impedance will cause the current sensor to saturate at a maximum value. The pre-charge circuit may include an inductor and a switching device configured to connect the traction battery to the inductor and wherein the inductor connects the switching device to the electrical impedance. The vehicle may further comprise at least one controller programmed to output the duty cycle for the pre-charge circuit based on a difference between a measured current through the pre-charge circuit and a desired current. The pre-charge circuit may be further configured to control flow of current such that, as the voltage approaches the voltage of the traction battery, a frequency of the pre-charge circuit approaches zero.

A vehicle includes a contactor configured to connect a traction battery and electrical impedance, and a pre-charge circuit. The pre-charge circuit is configured to, (i) in response to a close signal for the contactor, control current flow through the pre-charge circuit such that as a voltage at the electrical impedance approaches a voltage of the traction battery, a frequency of the pre-charge circuit approaches zero and a current through the pre-charge circuit approaches a minimum value, and (ii) in response to the current falling below a predetermined value, close the contactor. The pre-charge circuit may be further configured to measure the current flow through the pre-charge circuit and control a current through the pre-charge circuit to a predetermined range based on the measure. The pre-charge circuit may be further configured to control current flow such that, as the voltage at the electrical impedance approaches the voltage of the traction battery, a duty cycle for the pre-charge circuit approaches 100%. The vehicle may include at least one controller programmed to, in response to a measured time being outside of a predetermined range, set a diagnostic code, wherein the measured time is a duration of time for the current through the pre-charge circuit to fall below the predetermined value. The pre-charge circuit may include a current sensor having a maximum value such that a current less than a rated current of the electrical impedance will cause the current sensor to saturate at the maximum value. The pre-charge circuit may include an inductor and a switching device configured to connect the traction battery to the inductor and wherein the inductor connects the switching device to the electrical impedance.

A method of pre-charging an electrical load from a battery includes receiving a signal to close a contactor, measuring a current through an inductor connected across the contactor, operating a switching device to control current through the inductor based on the measured current, and closing the contactor in response to the measured current falling below a predetermined value while the switching device is activated. Operating the switching device to control current through the inductor may include generating a frequency and a duty cycle for the switching device based on an error between a desired current and the measured current. Operating the switching device to control current through the inductor may include generating a frequency and a duty cycle for the switching device to control the measured current in a predetermined range. The predetermined range may be based on a capacitance of an electrical load and a desired pre-charging time. The current through the inductor may be controlled to a value that is substantially less than a rated current of the electrical load. Operating the switching device to control current through the inductor may include turning the switching device on when the measured current falls below a first predetermined threshold and turning the switching device off when the measured current exceeds a second predetermined threshold that is greater than the first predetermined threshold such that a duty cycle and a switching frequency for the switching device result. The method may further include measuring a time required for the measured current to fall below the predetermined value and storing a diagnostic code if the measured time exceeds a first predetermined time or is below a second predetermined time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
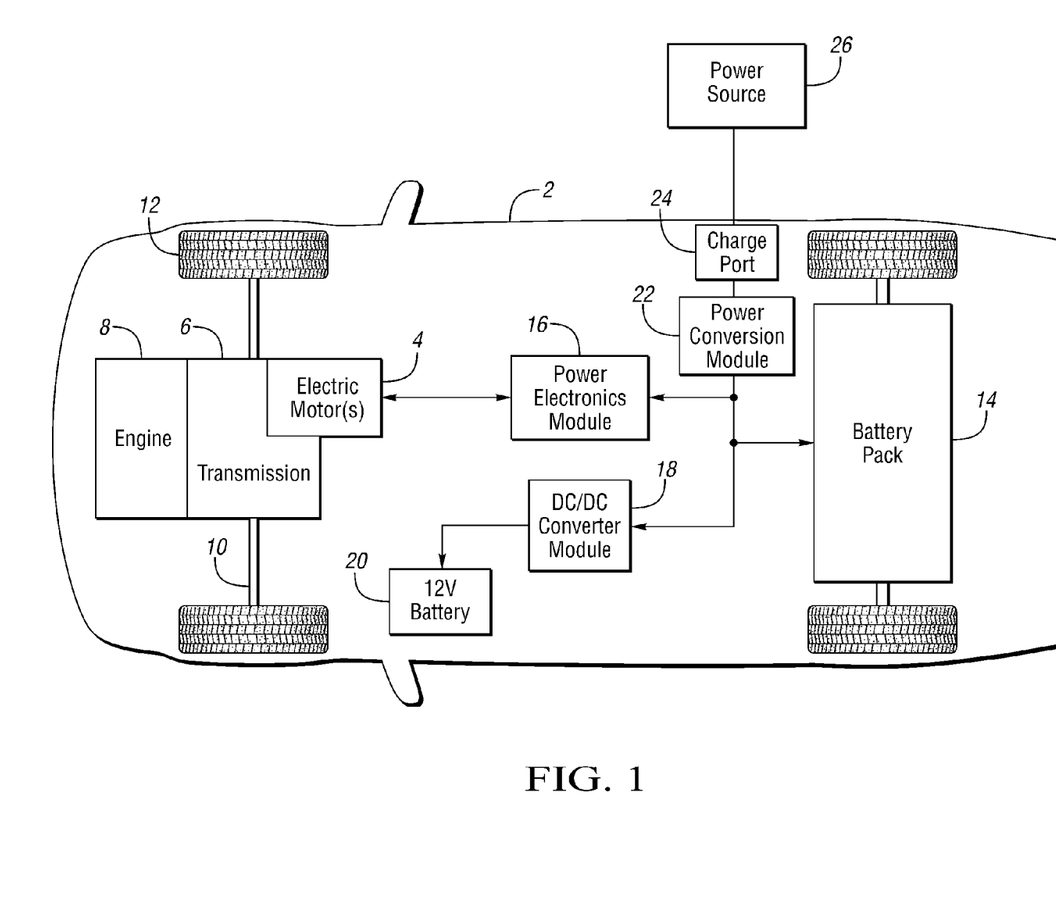
FIG. 1 is a diagram of a plug-in hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 may also be mechanically connected to a drive shaft 10 that is mechanically connected to the wheels 12. The electric motors 4 can provide propulsion and deceleration capability when the engine 8 is turned on or off. The electric motors 4 may also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 stores energy that can be used by the electric motors 4. The battery pack 14 is often referred to as a traction battery. A vehicle battery pack 14 typically provides a high voltage DC output. The battery pack 14 is electrically connected to at least one power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The methods described herein are equally applicable to a pure electric vehicle.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads, such as heaters and compressors, may be connected directly without the use of a DC/DC converter module 18. In a typical vehicle 2, the low voltage systems are electrically connected to a 12V battery 20. An all-electric vehicle may have a similar architecture but without the engine 8.

The vehicle 2 may be a plug-in hybrid in which the battery pack 14 may be recharged by an external power source 26. The external power source 26 may provide AC or DC power to the vehicle 2 by electrically connecting through a charge port 24. The charge port 24 may be any type of port configured to transfer power from the external power source 26 to the vehicle 2. The charge port 24 may be electrically connected to a power conversion module 22. The power conversion module 22 may condition the power from the external power source 26 to provide the proper voltage and current levels to the battery pack 14. In some applications, the external power source 26 may be configured to provide the proper voltage and current levels to the battery pack 14 and the power conversion module 22 may not be necessary. The following description applies equally to any vehicle 2 utilizing a battery pack 14.

Figure 2:
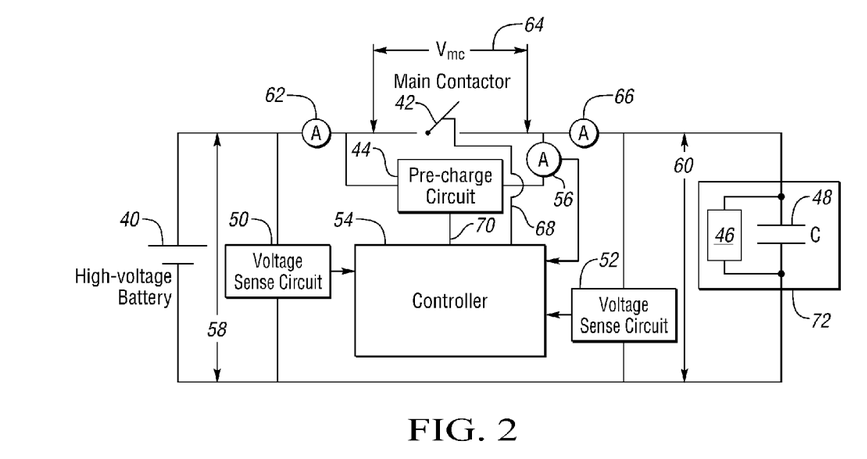
FIG. 2 is a diagram of a possible arrangement for connecting a high-voltage battery pack to electrical loads within a vehicle.

FIG. 2 illustrates a high-voltage DC bus control architecture for a vehicle. The high-voltage battery 40 may be of any chemistry, such as NIMH, lead-acid or lithium-ion. The high-voltage battery 40 may be electrically connected to a main contactor 42. The main contactor 42 may default to an open position such that the high-voltage battery 40 is disconnected from a load impedance 72. The load impedance 72 may be represented as having a capacitive 48 portion and a resistive/inductive portion 46. In the open position, the high-voltage battery 40 cannot provide power to load impedance 72.

A typical electrical impedance 72 in a vehicle will contain some capacitance 48. The impedance 72 may include any devices (e.g., inverters, DC/DC converters, etc.) that are connected to the high-voltage bus. The impedance 72 may be comprised of separate power electronics devices, each having its own capacitance 48 associated with it. The capacitance 48 may actually be comprised of multiple capacitances connected in parallel or series. Capacitance 48 may also be added to smooth and filter the bus voltage. The capacitance 48 may represent an equivalent capacitance for the entire load side of the electrical system. The load impedance 72 represents the total impedance of all modules that may be connected to the high-voltage bus.

A signal or request to close the main contactor 42 may be issued in response to an ignition on request by the driver. The signal to close the main contactor 42 may also be issued in response to a charger being connected. In general, whenever it is required for the high voltage battery 40 to be connected to other devices, a request to close the main contactor 42 may be issued. In cases of vehicle accident, a request to open the main contactor 42 may be issued to limit high voltage exposure to the vehicle occupants and rescuers. The signals to open and close the main contactor 42 may be received by one or more controllers 54 that control the operation of the main contactor 42 and pre-charge circuit 44. Communication of the open and close signals may be via discrete signal or serial communications bus (e.g., CAN).

The simplest implementation of a main contactor 42 would be a manually operated switch. This type is not used in practice for many reasons. The main contactor 42 may be further comprised of a control mechanism, such as a relay, that can close the contactor 42 when activated. For example, when a relay is energized, it may cause the contactor 42 to move to a closed position and allow current to flow through the main contactor 42. When the main contactor 42 is closed, the high-voltage battery 40 is electrically connected to the electrical impedance 72. When the main contactor 42 is closed, the electrical impedance 72 may draw current from the high-voltage battery 40 through the main contactor 42.

The control mechanism of the main contactor 42 may be connected to a controller 54. For example, a coil of the relay that controls the main contactor 42 may be electrically connected (represented by 68) to the controller 54. The controller 54 may be configured to energize and de-energize the coil to actuate the main contactor 42 to close and open. The controller 54 may also be configured to measure various system voltages. The voltage across the load 60 may be measured using a voltage sense circuit 52 that may be configured to isolate high-voltage from the controller 54 and to scale the voltage 60 to an appropriate level for the controller 54. In a similar manner, the voltage across the high-voltage battery 58 may also be measured. A separate voltage sense circuit 50 may be used to isolate high-voltage from the controller 54 and to scale the voltage 58 to an appropriate level for the controller 54.

Issues may arise when closing the main contactor 42 with a voltage across the main contactor 42. The voltage across the main contactor may be denoted as $V_{mc}$ 64. In a typical situation where the capacitance 48 is fully discharged, there may be a large $V_{mc}$ 64 before switching on the main contactor 42. One property of a capacitive load 48 is that the voltage may not change instantaneously. The current through the capacitive load 48, however, may change rapidly. A large inrush current may be created upon switching a high voltage into the capacitive load 48. The large inrush current may cause an arc across the main contactor 42 during switching. This arcing may damage the main contactor 42. Ideally, a means of limiting this arcing is desired.

To minimize arcing of the main contactor 42, a pre-charge circuit 44 may be implemented across the main contactor 42. Prior art pre-charge circuits typically consist of a pre-charge contactor in series with a resistance, where the resistance is selected to control the amount of current that can flow when the pre-charge contactor is closed. Prior art systems typically use the sensed voltages across the load and battery (60 and 58) to determine when to end the pre-charge operation and close the main contactor 42. When the difference between the two voltages (60 and 58) falls below a threshold, the main contactor 42 may be closed. A disadvantage of this technique is that the voltage difference is not typically reduced to zero. Any voltage difference across the main contactor 42 allows an inrush current, limited only by the low resistance of the traction battery and electrical distribution system, to flow when the contactor is closed which may reduce the life of the contactor. When a resistor is used in the pre-charge circuit, the voltage across the main contactor 64 can never be zero because of the resistance. In addition, measurement errors are introduced as two sensor values must be measured and processed. Depending on the resolution of the voltage measurement, it may not be feasible to determine a difference that is close to zero. Alternatively, to obtain appropriate resolution, higher resolution A/D converters are required, adding cost to the system. These measurement errors may stack up under certain conditions and allow the main contactor 42 to be closed with a voltage difference greater than zero leading to a lower contactor life.

The pre-charge circuit 44 may be placed in parallel with the main contactor 42. One side of the pre-charge circuit 44 may be electrically connected to the high-voltage battery 40. Another side of the pre-charge circuit 44 may be electrically connected to the electrical impedance 72. A controller 54 may be configured to control the operation of the pre-charge circuit 44. The pre-charge circuit 44 may limit the flow of current into the electrical impedance 72 when the high-voltage battery 40 is connected. The controller 54 may provide one or more control signals 70 to control the operation of the pre-charge circuit 44. The control signal 70 may be a signal to control a switching device (e.g., gate drive of a MOSFET—FIG. 3 108). The desired effect of the pre-charge circuit 44 is to minimize the inrush current through the main contactor 42 when the main contactor 42 is switched on by minimizing the voltage, Vmc 64.

A current sensor 56 may measure the current through the pre-charge circuit 44. The current sensor 56 may provide a signal to the controller 54 that indicates the amount of current flowing through the pre-charge circuit 44. The current sensor 56 or controller 54 may include any signal conditioning circuitry that may be necessary to scale and condition the current signal. This signal may be used to control the operation of the pre-charge circuit 44 to limit the amount of current flowing to the electrical impedance 72 during the pre-charge operation. The current sensor 56 may include any existing technologies such as a resistive sensor, a voltage differentiator circuit, or a Hall-effect sensor. The current sensor 56 may have a low resistance to minimize any voltage drop across the sensor.

The placement of the current sensor 56 at the output of the pre-charge circuit 44 may have some advantages over other placements. Other possible placements may include measuring the current going into the load 66 and measuring the current coming out 62 of the high-voltage battery 40 and into the main contactor 42. The current sensors 62 and 66 may also provide signals to the controller 54 for control and monitoring purposes. Locations such as 62 and 66 have a disadvantage at lower currents as these sensors are generally required to measure currents up to the rated current of the electrical load 72. The maximum range required of these sensors may be on a scale of hundreds of amps. The high maximum range of these sensors means that the resolution will be low and therefore, these sensors may not be capable of measuring small currents. Alternatively, to increase the resolution of these current sensors, high resolution A/D converters may be necessary adding to the cost and making the measurements more susceptible to noise.

The controller 54 may control the current flowing through the pre-charge circuit 44. By limiting the magnitude of the current flowing through the pre-charge circuit 44, the required maximum measurement value of the current sensor 56 may be lower. Having a lower maximum current requirement allows a higher resolution current signal to be measured. A higher resolution signal may be useful for controlling the current and may allow a more precise current control. In addition, the pre-charge circuit 44 may also require smaller components since less heat may be developed due to the lower currents. An advantage of a high-resolution current sensor 56 is that small currents can be measured and the pre-charge circuit 44 can better prevent current flow when closing the main contactor 42. This may lead to a lower cost pre-charge circuit 44 as the components do not have to handle high currents. During normal operation when the main contactor 42 is closed, another current sensor (e.g., 62 or 66) may be required since no current will be flowing through the pre-charge circuit 44. The primary benefit of ensuring no current flow is that the life of the main contactor 42 may be extended as there will be no current flow when switched on. Accuracy of the pre-charge process is also improved over prior methods since only one sensor is used for the control. Measurement noise and tolerances will only affect the one sensor. In addition, the single sensor may have higher resolution than prior configurations.

Figure 3:
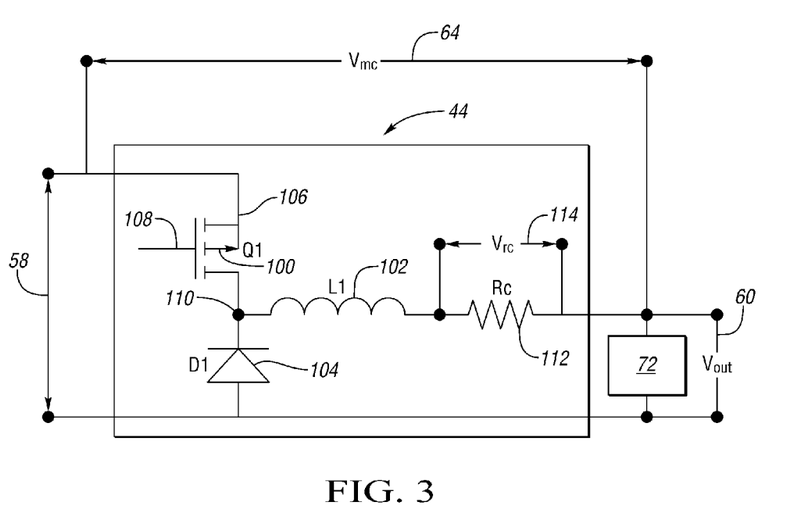
FIG. 3 is a diagram of a possible pre-charge circuit arrangement.

The pre-charge circuit 44 may be comprised of a solid-state switching device that may be controlled by a controller 54. FIG. 3 shows one possible embodiment of the pre-charge circuit 44. The solid-state switching device may be a MOSFET 100. The source 106 of the MOSFET may be electrically connected to the positive terminal of the high-voltage battery 40. The drain 110 of the MOSFET may be connected to an inductor 102. A diode 104 with one side connected to the negative terminal of the high voltage battery (40 FIG. 2) and the other side connected to the MOSFET drain 110 and the inductor 102 may be present. The inductor 102 may then be connected to the electrical load 72. The gate drive 108 of the MOSFET 100 may be connected to a controller (54 FIG. 2). The circuit may be described as a buck converter circuit.

The pre-charge circuit 44 may also include a current sensing resistor 112. The current sensing resistor 112 may be a small resistance value to minimize the voltage drop across the pre-charge circuit 44. The current sensing resistor 112 may have one end connected to the inductor 102 and the other end connected to the electrical impedance 72. The voltage across the current sense resistor 114 is proportional to the current flowing through the resistor 112. A controller (54 FIG. 2) may monitor the voltage, $V_{rc}$ 114, across the current sense resistor 112 to control the current through the pre-charge circuit 44. Other current sensing schemes may be possible depending on the current measurement technology selected.

The switching device 100 may be controlled to limit the current flowing through the pre-charge circuit 44. The current may be limited to a relatively low value to avoid any negative effects of a large inrush current. The current flowing through the pre-charge circuit 44 may be limited to a value substantially less than a rated current for the electrical load 72 being pre-charged. For example, the current may be limited to a value of 5 Amps or less while the rated load current may be hundreds of amps. Limiting the current affects the rate of voltage increase of the electrical load 72. Limiting the current to a generally constant value may cause the load voltage 60 to rise linearly up to the battery voltage 58. The time required for the capacitive portion of the electrical load 72 to charge up to the battery voltage 58 may be set to a predetermined amount of time. In order to achieve the desired rise time, the inductance 102 and the switching frequency of the switching device 100 of the pre-charge circuit 44 may be appropriately chosen. In general, the capacitive portion of the electrical load 72 may be known and the pre-charge circuit 44 may be designed to achieve a desired voltage rise time.

The duty cycle and switching frequency of the switching device 100 may be adjusted based on the current. The current and frequency may fall to zero as the target voltage is equalized with the source voltage. For example, current thresholds may be defined about a desired average inductor current, $I_{av}$. A threshold above the desired average inductor current may be defined as $I_{TH}$. Another threshold below the desired average inductor current may be defined as $I_{TL}$. When the measured current is below $I_{TH}$, the switching device 100 may be turned on. When the measured current exceeds $I_{TH}$, the switching device 100 may be turned off. When the switching device 100 is turned off, the current through the inductor will decrease. When the measured current falls below $I_{TL}$, the switching device 100 may be turned on again. This cycle may be repeated continually. As the voltage across the pre-charge circuit and the current through the pre-charge circuit changes, the duty cycle of the control signal may change in response. Over time, the voltage across the switching device 100 will decrease and the switching frequency may decrease as the current increases more slowly. As the voltages across the main contactor equalize, it may take a longer time for current to exceed $I_{TH}$. This tends to naturally decrease the switching frequency and increase the duty cycle. At some point, the switching device 100 will be turned on and current will actually decay to zero. When the current through the inductor has decayed to zero, the pre-charge is complete and the voltages on either side of the main contactor are equalized. At this point in time, the main contactor may be closed.

The generally constant bus charging current value may be selected based on the bus capacitance and a desired bus charging time. The current through the load may be represented as:

$$I = C*dv/dt + V/R$$

where C is the bus capacitance, dv/dt is the rate of voltage increase, and V is the voltage across the load. During the pre-charge time, a generally constant current may be applied so that the voltage rises at a desired rate. During pre-charge, the load resistance, R, may be expected to be a large value such that V/R has minimal impact on the current draw. For the capacitive load, the desired current may be based on I=C*dV/dt. The desired dV/dt may be determined as the battery voltage divided by the desired bus charging time ($V_{max}/T_{des}$). Should the load resistance, R, have a value during pre-charge that affects the current draw, the current may be modified accordingly.

Since a generally constant current is applied, an expected voltage rise time should be observed within a predetermined range about the expected value. A controller may monitor the time required for the current to fall below a predetermined value. A diagnostic condition may be detected if the voltage rise is outside of an expected range about the expected rise time. For example, if the load is shorted, the voltage will rise rapidly as the capacitive portion may be bypassed by the short. A fast rise to the battery voltage may signal a short condition and a diagnostic code may be set by the controller. Additionally, if the time to attain the battery voltage is greater than anticipated, there may be an issue with shorted components or capacitance changes. For example, if the load resistance, R, is less than expected, more current may go to the resistance portion rather than to charge the capacitance. A rise to the battery voltage that requires more time than expected may trigger the controller to set a diagnostic code.

As a diagnostic check, the time required to pre-charge may be monitored. As the system may be designed to have a predicted pre-charge time, differences from the predicted pre-charge time may indicate fault conditions within the load. A diagnostic code may be stored when the pre-charge operation completes in an amount of time that is less than the expected completion time. Additionally, a diagnostic code may be stored when the pre-charge operation completes in an amount of time that is greater than the expected completion time. A diagnostic code may be set if the pre-charge operation does not complete within a predetermined pre-charge timeout.

Figure 4:
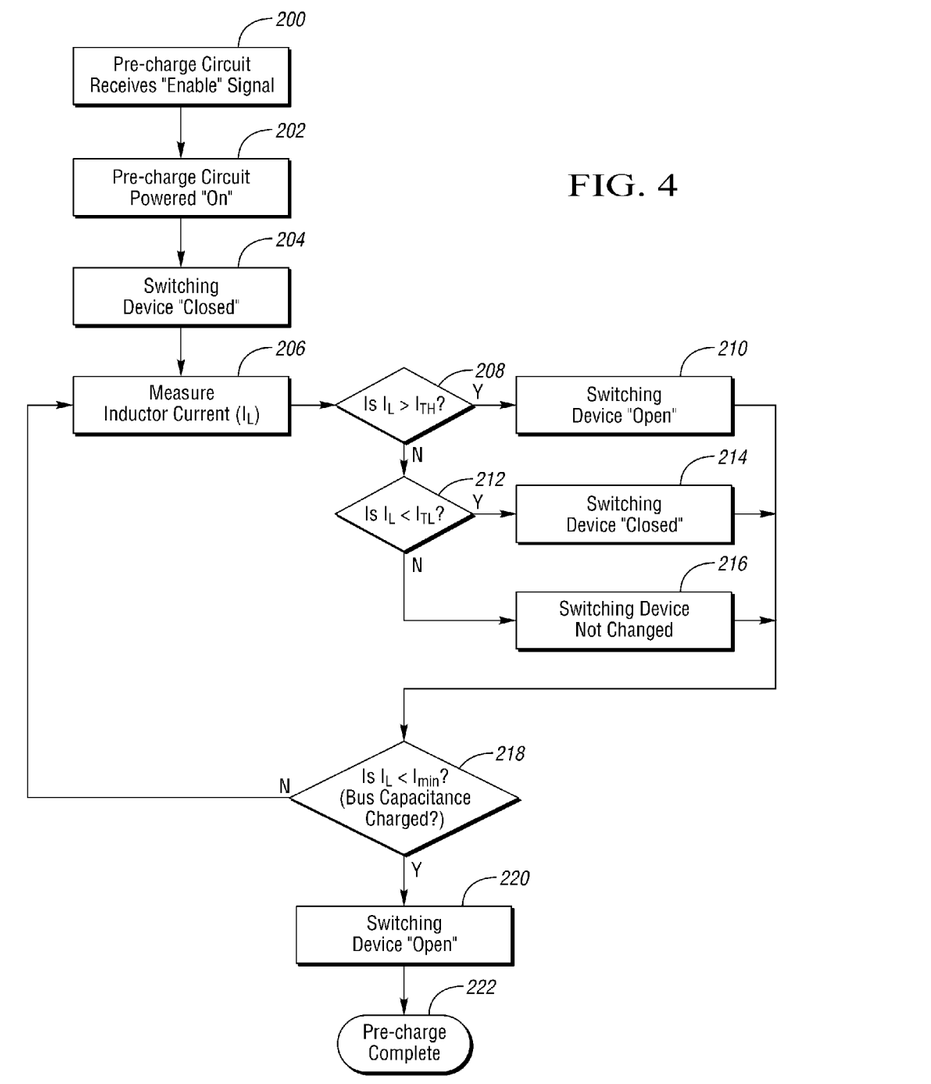
FIG. 4 is a flowchart of a possible pre-charge circuit current control scheme.

FIG. 4 illustrates one possible implementation for the system as described. The pre-charge circuit may receive an enable signal from another controller or module within the vehicle 200. The pre-charge circuit may be powered on 202. This may involve ensuring that required devices within the controller necessary to pre-charge have appropriate power enabled. The switching device may be closed 204 to connect battery voltage to the electrical impedance. The current through the inductor ($I_L$) may be measured 206 and an average current ($I_{av}$) may be calculated 206. The measured inductor current may be compared to threshold limits above and below the expected average current to ensure that the current is within the proper range. The inductor current may be compared to the upper threshold 208. If the inductor current is above the upper threshold, the switching device may be opened 210. If the inductor current is below the upper threshold, the inductor current may be compared to the lower threshold 212. If the inductor current is below the lower threshold, the switching device may be closed 214. If the inductor current is above the lower threshold, then the current switching device state may be retained 216. A check may be made to determine if the vehicle bus capacitance is charged by comparing the inductor current to a minimum threshold value 218. If the bus is not charged, the process of measuring the inductor current 206 and applying PWM logic (208-216) may be repeated. When the bus is charged, the switching device may be opened 220 and the pre-charge is completed 222. The main contactor may be switched on.

An advantage of the disclosed pre-charge circuitry 44 is that the load voltage 60 can be made equal to the battery pack voltage 58. A traditional pre-charge circuit using a resistor may only reach a certain load voltage 60 due to the voltage drop across the resistance. A ten-volt difference across the main contactor 42 may still cause damage to the main contactor 42 when switched on as some current will flow at the moment of contact. This current flow may tend to cause wear on the main contactor 42 over time. The disclosed pre-charge circuit 44 and control scheme allows the load voltage 60 to rise closer to the battery pack voltage 58, thereby minimizing the voltage difference, Vmc 64, across the main contactor 42 when switched on. By minimizing the amount of resistance in the pre-charge circuit 44, the voltage drop 64 across the main contactor may be minimized.

An additional advantage is that by controlling to current instead of voltage is that it is more likely that the contactor will be closed with zero current. That is, that the voltage difference between the battery voltage 58 and the electrical impedance 60 will be minimized. A controller that is controlling the voltage across the load impedance will decrease a control signal as the output voltage 60 approaches the battery voltage 58. This has the effect of limiting the flow of current and slowing the rate of the voltage increase towards the end of the pre-charge operation. The disclosed pre-charge circuit 44 attempts to apply a constant charge current that goes to zero as the voltages converge. The disclosed pre-charge circuit 44 will actually apply a maximum control signal as the voltages converge, insuring that the output voltage 60 will be as close as possible to the battery voltage 58. Knowledge of the battery internal resistance is not required to close the main contactor since the pre-charge cycle is not terminated by the voltage measurement.

Another way of terminating the pre-charge operation may be to observe when the load voltage 60 has stabilized at some maximum value. This maximum value may depend on the resistance of the pre-charge circuit 44 as well as the internal resistance of the high-voltage battery 40. The maximum value may not necessarily be the voltage of the high-voltage battery 58 but rather some percentage of the high-voltage battery voltage 58. When the pre-charge operation is completed, the main contactor 42 may be switched on and the pre-charge circuitry 44 switched off. After switching the main contactor 42 on, the load voltage 60 and the battery pack voltage 58 may equalize and current may flow through the main contactor 42. Alternatively, the load voltage 60 and the battery voltage 58 may be compared to determine if they are within a certain amount of one another. This method will typically have a voltage across the main contactor 64 when closing.

The disclosed pre-charge circuitry 44 may be used with different batteries. Different battery chemistries have different properties. The battery chemistry affects the internal resistance of a high-voltage battery. In general, a low resistance is preferred to minimize heat losses within the battery. However, as the resistance is lowered, the pre-charge circuitry 44 may need to be redesigned to compensate. If the resistance of the pre-charge circuit 44 is large in comparison to the internal resistance of the battery pack, a larger voltage difference across the main contactor 42 may be present after pre-charging. The disclosed scheme minimizes these effects as the pre-charge is actively controlled to minimize the voltage across the main contactor.

In one possible embodiment, the current through the pre-charge circuit 44 may be controlled to a constant value or within a range. Controlling the current to a constant value may cause the load voltage 60 to rise linearly with time up to a maximum value. A controller (54 FIG. 2) may perform the current control during pre-charge by controlling the gate drive of the switching device 108. The controller (54 FIG. 2) may perform this current control using electronic circuitry or some combination of electronic circuitry and microprocessor based software controls. A simple hysteresis controller may be implemented in hardware or hardware/software. A desired output current range may be comprised of a lower value and an upper value. The current flowing through the pre-charge circuit may be measured. When the output current is less than the desired lower value, the switching device may be switched on. When the output current is above the desired upper value, the switching device may be switched off. The amount of variation or ripple in the current will depend on the difference between the upper value and the lower value. A larger difference may lead to a lower switching frequency, while a smaller difference may lead to a higher switching frequency. By switching between the upper and lower values an average current may be maintained over time.

The control may be performed by controlling the duty cycle of the gate of the switching device 108. The duty cycle may be defined as the amount of time in a given time period that the device is switched on. A value of 100% may indicate that the switching device is switched completely on. In practice, the maximum duty cycle may be reduced to a lower value for diagnostic purposes. For example, a maximum duty cycle of 90% may be imposed to allow checks for short circuits during the interval where the switching device is expected to be switched off.

The simple hysteresis controller may be implemented as an electronic circuit or the logic may be performed in a microprocessor whose output is the gate drive input of a switching device 108. More sophisticated control methods may be employed. A controller-implemented solution may vary the upper and lower current values to change the switching frequency during pre-charge. The pre-charge current may also be varied to reduce or lengthen the pre-charge time. The controller may also monitor the pre-charge current and system voltages to ensure that the system is performing properly.

As the voltage across the load 60 rises to the level of the battery voltage 58, current flow will begin to decrease. In a controller that is controlling to a specific value of current, the duty cycle will increase to try and maintain the current at the specific value. As this happens, the duty cycle may increase up to the maximum allowed value. The maximum value of duty cycle may be 100% or full on. At a certain point, the current controller may not be able to achieve the desired current value even though the device is at the maximum allowed value. This situation indicates that the pre-charge operation may be nearing completion. When current can no longer be controlled to the target value, the current control may be stopped and the main contactor may be closed. The pre-charge operation may be completed when the current falls below a predetermined threshold value. An advantage of this is that the voltages on either side of the pre-charge circuitry do not need to be monitored for pre-charge purposes.

An advantage of the disclosed pre-charge circuit is that component costs may be minimized. A specific pre-charge time may be specified which may define the desired current level. An inductor 102 may be selected that is rated at the desired current level. Typically, costs are reduced as the current rating is lowered. Additionally, the circuit is flexible so that multiple pre-charge times may be defined for different situations. An inductor 102 current rating may be selected to support the fastest pre-charge time required. The circuit may be controlled at different current levels based on the specific pre-charge time that is required. An additional advantage is that the pre-charge may be done with lower current values and the current sensor may be designed to give full resolution over the pre-charge current range instead of the load current range. This allows for an accurate current control to be performed during pre-charge.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   a contactor configured to connect the traction battery and an electrical impedance; and
   a pre-charge circuit, including a current sensor having a range such that a current less than a rated current of the electrical impedance causes the current sensor to saturate at a maximum value, configured to, (i) in response to a close signal for the contactor, control flow of current from the traction battery through the pre-charge circuit to the electrical impedance to increase voltage at the electrical impedance such that as the voltage approaches a voltage of the traction battery, a duty cycle of the pre-charge circuit approaches 100% and the current through the pre-charge circuit approaches zero, and (ii) in response to a magnitude of the current falling below a predetermined value, close the contactor.

2. The vehicle of claim 1 wherein the pre-charge circuit is further configured to measure the current flow through the pre-charge circuit and control the current through the pre-charge circuit to a predetermined range based on the measure.

3. The vehicle of claim 1 wherein the pre-charge circuit is further configured to control current through the pre-charge circuit to a predetermined range substantially less than a rated current of the electrical impedance.

4. The vehicle of claim 1 wherein the pre-charge circuit includes an inductor and a switching device configured to connect the traction battery to the inductor and wherein the inductor connects the switching device to the electrical impedance.

5. The vehicle of claim 1 further comprising at least one controller programmed to output the duty cycle for the pre-charge circuit based on a difference between a measured current through the pre-charge circuit and a desired current.

6. The vehicle of claim 1 wherein the pre-charge circuit is further configured to control flow of current such that, as the voltage approaches the voltage of the traction battery, a frequency of the pre-charge circuit approaches zero.

7. A vehicle comprising:
   a contactor configured to connect a traction battery and an electrical impedance; and a pre-charge circuit configured to, in response to a close signal for the contactor, control current flow through the pre-charge circuit by decreasing a switching frequency of the pre-charge circuit as a voltage at the electrical impedance approaches a voltage of the traction battery, and in response to the current falling below a predetermined value, close the contactor.

8. The vehicle of claim 7 wherein the pre-charge circuit is further configured to measure the current flow through the pre-charge circuit and control a current through the pre-charge circuit to a predetermined range based on the measure.

9. The vehicle of claim 7 wherein the pre-charge circuit is further configured to control current flow such that, as the voltage at the electrical impedance approaches the voltage of the traction battery, a duty cycle for the pre-charge circuit approaches 100%.

10. The vehicle of claim 7 further comprising at least one controller programmed to, in response to a measured time being outside of a predetermined range, set a diagnostic code, wherein the measured time is a duration of time for the current through the pre-charge circuit to fall below the predetermined value.

11. The vehicle of claim 7 wherein the pre-charge circuit includes a current sensor having a maximum value such that a current less than a rated current of the electrical impedance will cause the current sensor to saturate at the maximum value.

12. The vehicle of claim 7 wherein the pre-charge circuit includes an inductor and a switching device configured to connect the traction battery to the inductor and wherein the inductor connects the switching device to the electrical impedance.

13. A method of pre-charging an electrical load from a battery comprising:
by a controller,
receiving a signal to close a contactor;
measuring a current through an inductor connected across the contactor using a current sensor having a maximum value such that the current causes the current sensor to saturate at the maximum value when the current is less than a rated current of the electrical load;
operating a switching device to control current through the inductor based on the measured current; and
closing the contactor in response to the measured current falling below a predetermined value while the switching device is activated.

14. The method of claim 13 wherein operating the switching device to control current through the inductor includes generating a frequency and a duty cycle for the switching device based on an error between a desired current and the measured current.

15. The method of claim 13 wherein operating the switching device to control current through the inductor includes generating a frequency and a duty cycle for the switching device to control the measured current in a predetermined range.

16. The method of claim 15 wherein the predetermined range is based on a capacitance of an electrical load and a desired pre-charging time.

17. The method of claim 13 wherein the current through the inductor is controlled to a value that is substantially less than the rated current of the electrical load.

18. The method of claim 13 wherein operating the switching device to control current through the inductor includes turning the switching device on when the measured current falls below a first predetermined threshold and turning the switching device off when the measured current exceeds a second predetermined threshold that is greater than the first predetermined threshold such that a duty cycle and a switching frequency for the switching device result.

19. The method of claim 13 further comprising measuring a time required for the measured current to fall below the predetermined value and storing a diagnostic code if the measured time exceeds a first predetermined time or is below a second predetermined time.

* * * * *